United States Patent
Sun et al.

(10) Patent No.: US 8,417,864 B2
(45) Date of Patent: Apr. 9, 2013

(54) CASCADE-ABLE SERIAL BUS DEVICE WITH CLOCK AND MANAGEMENT AND CASCADE METHODS USING THE SAME

(75) Inventors: Yuan-Heng Sun, Taipei County (TW); Yeu-Horng Shiau, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 251 days.

(21) Appl. No.: 12/761,347

(22) Filed: Apr. 15, 2010

(65) Prior Publication Data

US 2011/0153888 A1   Jun. 23, 2011

(30) Foreign Application Priority Data

Dec. 22, 2009   (TW) ................. 98144140 A

(51) Int. Cl.
G06F 3/00 (2006.01)
G06F 13/00 (2006.01)
H05K 7/10 (2006.01)

(52) U.S. Cl.
USPC ............... 710/301; 710/3; 710/107; 710/302; 710/316

(58) Field of Classification Search .......... 710/2–3, 710/7, 8–9, 14, 62, 72–74, 300–301, 303, 710/104–106, 305, 316, 200, 107, 260, 302
See application file for complete search history.

(56) References Cited

U.S. PATENT DOCUMENTS

| | | | |
|---|---|---|---|
| 5,640,106 A * | 6/1997 | Erickson et al. ............ | 326/38 |
| 5,963,464 A * | 10/1999 | Dell et al. ................. | 365/52 |
| 6,349,036 B1 | 2/2002 | Chang et al. | |
| 6,804,749 B2 * | 10/2004 | Chien et al. ............... | 711/115 |
| 7,184,264 B2 * | 2/2007 | Le .......................... | 361/679.32 |
| 7,286,384 B2 * | 10/2007 | Wendt et al. ............... | 365/63 |
| 7,397,272 B1 * | 7/2008 | Wennekamp ................ | 326/38 |
| 2002/0195500 A1 * | 12/2002 | Maruyama ................. | 235/492 |
| 2003/0074505 A1 * | 4/2003 | Andreas et al. ............. | 710/110 |
| 2004/0034738 A1 * | 2/2004 | Huang ...................... | 711/115 |
| 2005/0086413 A1 * | 4/2005 | Lee et al. .................. | 710/313 |
| 2005/0099834 A1 * | 5/2005 | Funaba et al. .............. | 365/63 |
| 2006/0025020 A1 * | 2/2006 | Yu et al. ................... | 439/630 |
| 2006/0028803 A1 * | 2/2006 | Pocrass .................... | 361/737 |
| 2006/0277333 A1 | 12/2006 | Sim et al. | |
| 2007/0165457 A1 | 7/2007 | Kim | |
| 2007/0233903 A1 * | 10/2007 | Pyeon ...................... | 710/1 |
| 2009/0070522 A1 * | 3/2009 | Poo ........................ | 711/103 |
| 2010/0005218 A1 * | 1/2010 | Gower et al. ............... | 711/5 |
| 2010/0011164 A1 * | 1/2010 | Choi et al. ................ | 711/115 |
| 2010/0030951 A1 * | 2/2010 | Kim ........................ | 711/103 |
| 2011/0059628 A1 * | 3/2011 | Chen ....................... | 439/61 |

* cited by examiner

Primary Examiner — Thomas J Cleary

(57) ABSTRACT

A cascade-able serial bus device for coupling between a host device and another serial bus device is disclosed. The host device includes a serial bus interface. The serial bus device includes a first connection interface, a second connection interface and a bypassing module. The first connection interface is coupled to the serial bus interface of the host device. The second connection interface is coupled to the second serial bus device. The bypassing module is coupled to a chip select (CS) signal line of the serial bus interface and the second connection interface for selectively bypassing or non-bypassing the CS signal to the second serial bus device.

23 Claims, 6 Drawing Sheets

CASCADE-ABLE SERIAL BUS DEVICE WITH CLOCK AND MANAGEMENT AND CASCADE METHODS USING THE SAME

CROSS-REFERENCE STATEMENT

This Application claims priority of Taiwan Patent Application No. 098144140, filed on Dec. 22, 2009, the entirety of which is incorporated by reference herein.

BACKGROUND

1. Technical Field

The disclosure relates generally to a cascade device of serial bus devices with clock and management method thereof, and, more particularly to cascade devices and methods capable of cascading and managing multiple serial bus devices, each of which with a clock.

2. Description of the Related Art

With the progress of science and technology, there has been an explosive increase in the use of removable electronic devices or so-called serial bus devices such as data storage devices or Input/Output (I/O) devices within a host device, e.g. an embedded system or electronic device (e.g. hand-held or portable devices including MID, NetBook, personal digital assists (PDAs), tablet personal computers, UMPC, personal computers (PC), Notebooks and so on) for expanding functions of the host device. For example, a removable device with a GPS module capable of providing a navigation function may be plugged into the host device such that the host device can perform the navigation function.

Serial bus devices (e.g. memory cards) may communicate with a host device (e.g. a mobile phone) for data transmission via a bus interface, such as a serial peripheral interface (SPI), a SD or a MMS bus interface. The bus interface has a clock signal and a chip selection signal such that the mobile phone may access to the memory card according to the clock signal when the chip selection signal is enabled.

The serial bus devices, however, require to connect to slots of the host device, wherein each slot may only accommodate a single serial bus device. Generally, as the host device may have only one slot for a serial bus device (e.g. a memory card) to plug into, such a host device may be no longer expanded after one serial bus device has been plugged.

US publication no. 2006/0277333 discloses a portable data storage device that is capable of cascading another portable data storage device, wherein the disclosed portable data storage device adopts an Universal Serial Bus (USB) interface on which no serial clock signal required. The disclosed portable data storage device utilizes a depacketizing method to decode a packet to obtain address information and controls a corresponding portable I/O device and data storage device according to the address information so as to achieve a goal for controlling two or more portable I/O devices and data storage devices. The USB interface, however, does not provide a clock signal and a chip selection signal and thus the disclosed portable data storage device can not be applied in serial bus devices that require a clock signal and a chip selection signal.

Another commonly used implementation for expanding is that data lines and clock signal line of the bus are shared while the chip selection line thereof is separated so that the chip selection line can be used to select any one of the serial bus devices. In such implementation, however, more slots are required for the host device to simultaneously support multiple removable electronic devices, increasing the hard ware cost. Moreover, it is also impossible to add more slots in a conventional portable electronic device since there is no room for more than on slot to be placed therein.

BRIEF SUMMARY

It is therefore an objective to provide a cascade-able serial bus device capable of cascading another serial bus device and management method for the cascaded serial bus devices.

An embodiment of a cascade-able serial bus device for coupling between a host device and another serial bus device, wherein the host device includes a serial bus interface. The serial bus device comprises a first connection interface, a second connection interface and a bypassing module. The first connection interface is coupled to the serial bus interface of the host device. The second connection interface is coupled to the second serial bus device. The bypassing module is coupled to a CS (chip select) signal line of the serial bus interface and the second connection interface for selectively bypassing or non-bypassing a CS signal according to a command sent by the host device. When the CS signal is being non-bypassed, the bypassing module transmits the CS signal to the serial bus device such that the host device utilizes a first function provided by the serial bus device. When the CS signal is being bypassed, the bypassing module transmits the CS signal to the second serial bus device via the second connection interface such that the host device utilizes a second function provided by the second serial bus device. A serial clock signal line and at least one data line of the serial bus interface are shared by the host device, the serial bus device and the second another serial bus device.

In one embodiment, a management method for managing cascaded at least one first serial bus device and one second serial bus device is provided, wherein the first serial bus device is coupled to a host device, the second serial bus device is coupled to the first serial bus device and each of the first and second serial bis devices ha a serial bus interface which is serial clock based. The management method comprises the following steps. First, a CS (chip select) signal is transmitted to the first serial bus device and the host device sends a first command to the first serial bus device to request the first serial bus device to reply the identification code of a first device therein. After receiving the first command, the first serial bus device replies the identification code of the first device of the first serial bus device to the host device according to the first command and then the host device sends again a second command to the first serial bus device and configures a relative address identification code corresponding to the first serial bus device to an address register of an interface control unit of the first serial bus device. The first serial bus device further determines whether to bypass or non-bypass the CS signal according to the second command and a comparison of whether the relative address identification code of the command matches the identification code stored in the address register of an interface control unit of the first serial bus device. When the command is a predetermined command and the relative address identification code of the command matches the identification code stored in the address register of the interface control unit of the first serial bus device, the CS signal is bypassed to the second serial bus device by the first serial bus device and the second serial bus device further determines whether to bypass the CS signal or to enable a second function according to the second command and a comparison of whether the relative address identification code of the command matches the identification code stored in an address register of an interface control unit of the second serial bus device. When the command is not the predetermined command and the relative address identification code of the command matches the identification code stored in the address register of the interface control unit of the first serial bus device, a first function is enabled by the first serial bus device.

In another embodiment, a cascading method for use in a first serial bus device with a clock for cascading at least one second serial bus device with the same clock is further provided, wherein the first serial bus device and the second serial bus device respectively have first and second bypassing modules, each of the bypassing modules with at least an input end, a first output end and a second output end. The method comprises providing a first connection interface for connecting to a host device, wherein the host device transmits a command and provides a CS signal and a serial clock signal line; and providing a second connection interface for connecting to the second serial bus device, wherein the input end of the first bypassing module receives the CS signal, the first output end is coupled to a first functional module for performing a first function and the second output end is coupled to the input end of the second bypassing module. When the command transmitted by the host device is a predetermined command, the first bypassing module bypasses the CS signal and transmits the CS signal to the second bypassing module via the second output end of the first bypassing module to perform a second function provided by the second serial bus device. When the command transmitted by the host device is not the predetermined command, the first bypassing module enables the first functional module to perform the first function.

Methods and systems may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION OF THE EMBODIMENTS

The following description is of the best-contemplated mode of carrying out the disclosure. This description is made for the purpose of illustrating the general principles of the disclosure and should not be taken in a limiting sense. The scope of the disclosure is best determined by reference to the appended claims.

Figure 1:
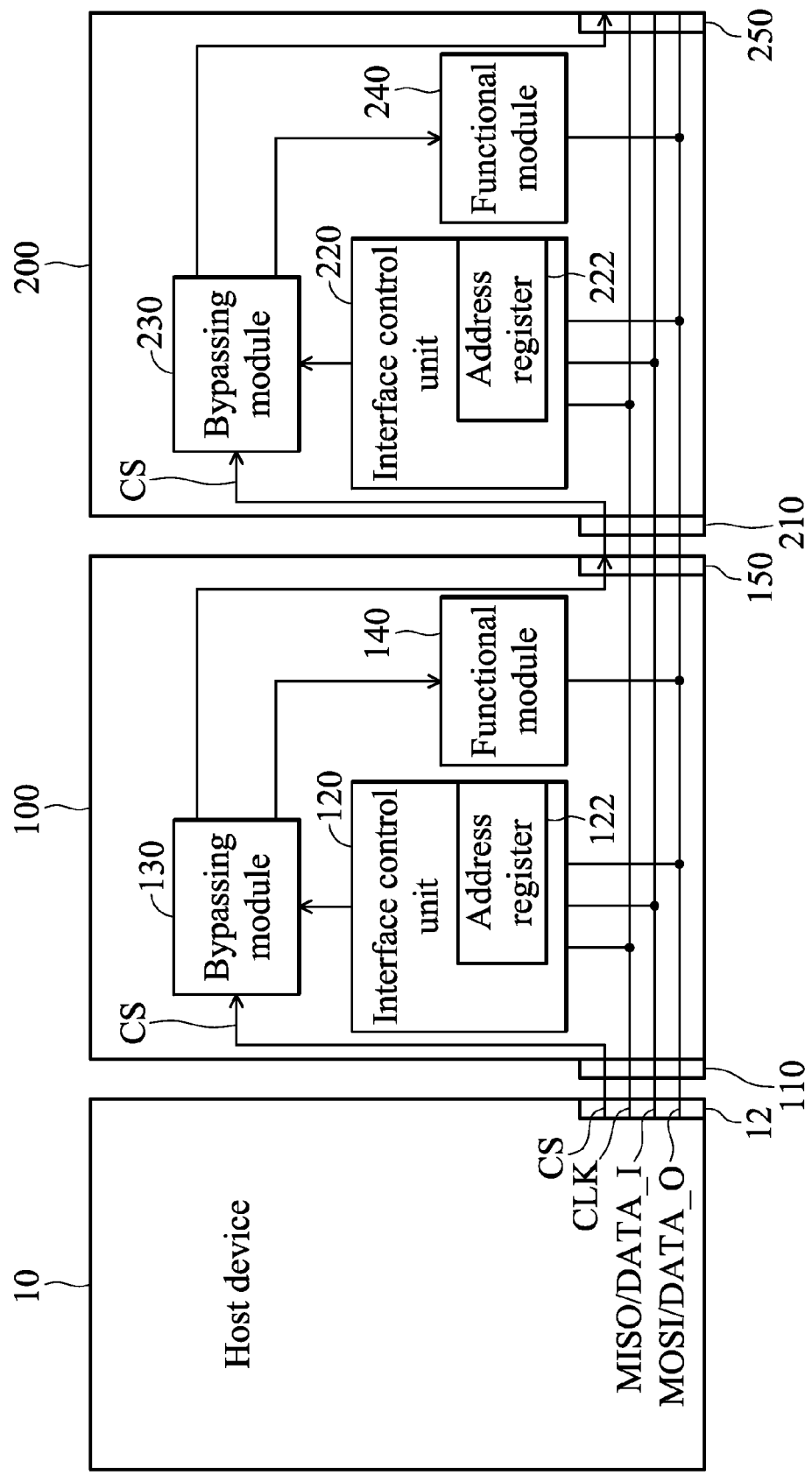
FIG. 1 is a schematic diagram illustrating an embodiment of a cascade-able serial bus device of the disclosure.

FIG. 1 is a schematic diagram illustrating an embodiment of a cascade-able serial bus device 100 of the disclosure. As shown in FIG. 1, the serial bus device 100 (also referred to as a first serial bus device) is coupled between a host device 10 and another serial bus device 200 (also referred to a second serial bus device), wherein hardware structure of the serial bus device 100 is similar to that of another serial bus device 200. The host device 10 may be, for example, any kinds of electronic devices with a serial bus interface that has a clock source, such as portable electronic devices (e.g. PDA, NetBook, MID or the like). The serial bus device 100 at least comprises a first connection interface 110, an interface control unit 120, a bypassing module 130, a functional module 140 and a second connection interface 150. The first connection interface 110 is coupled to a bus interface or a slot 12 of the host device 10 for receiving commands/data from or transmitting data to the host device 10. The bus interface 12 has a chip selection line CS, a serial clock signal line SERIAL_CLOCK (SCK) and at least one data line, such as data lines DATA_I/MISO (Master in slave out) and DATA_O/MOSI (Master output slave in), for providing a chip selection signal, a clock signal and at least one data signal (e.g. a command) respectively. The first connection interface 110 is a serial bus interface which has a chip selection line CS, a serial clock signal line SERIAL_CLOCK (SCK) and at least one data line, such as data lines DATA_I/MISO and DATA_O/MOSI. In operation, when the serial bus device 100 receives the chip selection signal, the serial bus device 100 will receive data from or send data to the bus at the failing edge of the chip selection signal line CS and the raising edge of the serial clock line SCK. For example, the serial bus device 100 may receive data from or send data to the bus at the failing edge of the chip selection line CS and the raising edge of the serial clock line SERIAL_CLOCK (SCK). The first connection interface 100 may be any serial bus interface with a clock source such as a SPI (Serial Peripheral Interface) like a SD interface, a MMC interface and so on.

The interface control unit 120 is coupled to the bypassing module 130, the functional module 140 and the bus interface (e.g. the serial clock signal line SCK and data lines DATA_I/MISO and DATA_O/MOSI shown in FIG. 1) for receiving data sent by the host device 10 via the bus interface, analyzes content of the received data and controls output of the bypassing module 130 according to the analyzing result such that the bypassing module 130 may selectively bypass or non-bypass the chip selection signal sent by the host device 10. The bypassing module 130 is coupled to the interface control unit 120 and the functional module 140 for enabling or disabling the functional module 140. The functional module 140 is capable of performing a specific function when receiving the chip selection signal sent by the bypassing module 130. For example, the functional module 140 may be an I/O (input/output) functional module such as a WiFi module, a BLUETOOTH module, a GPS module, Zigbee, camera module, 3G or WLAN wireless communication module, mobile TV transceiver module or other I/O modules, or a data storage module such as mass storage devices, but it is not limited thereto.

The second connection interface 150 is similar to the first connection interface 110 and is used for connecting to the serial bus device 200. In one embodiment, the first connection interface 110 may be a male connector while the second connection interface 150 may be a female connector, or vice versa. Note that structure of the serial bus device 200 is similar to that of the serial bus device 100. The first connection interface 110 and the second connection interface 150 may be MMC/SD (STD/Mini/Micro) interface.

When the CS signal is being non-bypassed, the bypassing module 130 transmits the CS signal to the current serial bus device 100 to enable the functional module 140 such that the host device 10 may utilize a first function provided by the functional module 140 in the serial bus device 100. When the CS signal is being bypassed, the bypassing module 130 transmits the CS signal to next cascaded serial bus device 200 via the second connection interface 150 such that the host device 10 may utilize a second function provided by the serial bus device 200.

Similarly, the serial bus device 200 at least comprises a first connection interface 210, an interface control unit 220, a bypassing module 230, a functional module 240 and a second connection interface 250. In one embodiment, the functional module 140 and the functional module 240 may be used to perform the same function such as both are storage devices for performing data storage function. In another embodiment, the functional module 140 and the functional module 240 may be devices that perform different functions, such as the functional module 140 may perform a first function (e.g. a data storage function) while the functional module 240 may perform a second function (e.g. an I/O function such as a GPS function, a WiFi function or the like).

The chip selection line CS of the first connection interface 210 is coupled to an output end of the bypassing module 130 of the serial bus device 100.

Note that the clock signal line and the date line of the serial bus interface are shared by the host device 10, the serial bus device 100 and the serial bus device 200 so that commands transmitted by the host device can be broadcasted to the serial bus device 100 and the serial bus device 200.

The interface control unit 120 may further comprise a relative address register (RAR) 122 for storing a relative address identification code corresponding to the serial bus device 100. Similarly, the interface control unit 220 may further comprise a relative address register (RAR) 222 for storing a relative address identification code corresponding to the serial bus device 200.

When receiving the CS signal from the host device 10, the interface control unit 120 receives a command from the data line, retrieves a relative address identification code from the received command and then compares the retrieved relative address identification code to the address identification code stored in the relative address register 122. When the relative address identification code of the command matches the address identification code stored in the address register 122, the interface control unit 120 directs the bypassing module 130 to enable the functional module 140 such that the functional module 140 may perform an operation corresponding to the received command. Commands that the interface control unit 120 may receive comprise, for example, an initialization command INITIAL, a bypass command BYPASS, a non-bypass command NON-BYPASS, an interrupt command INT and a resume command RESUME. The resume command RESUME is used for resuming all of the serial bus devices, i.e. the first serial bus device 100 and the second serial bus device 200, such that each of the serial bus devices is first changed to an idle state, then to a stand-by state after an initialization procedure and finally to an non-bypass state. Each of the states will be described more detail in below. The initialization command INITIAL is used for initializing the first serial bus device 100 and the second serial bus device 200. The non-bypass command NON-BYPASS is used for instructing the bypassing module 130 to transmit the CS signal to the functional module 140 so as to enable the first function. The bypass command BYPASS is used for instructing the bypassing module 130 to transmit the CS signal to the serial bus device 200 so as to enable the second function. Contrarily, when the relative address identification code of the command does not match the address identification code stored in the address register 122, which indicates that the command is not for the serial bus device 100, the serial bus device 100 ignores the command and does not perform any operation. The interrupt command INT is used for informing the host device to perform an interrupt processing routine to initialize a new serial bus device when it is plugged. The interrupt command INT and the interrupt processing routine will be described more detail in below.

When the interface control unit 120 receives a predetermined command (e.g. the bypass command BYPASS) and the relative address identification code of the command matches the address identification code stored in the address register 122, the interface control unit 120 instructs the bypassing module 130 to bypass the CS signal to the serial bus device 200 such that the functional module 240 is enabled by the serial bus device 200 to perform the second function. When the command is not the predetermined command (e.g. the non-bypass command NON-BYPASS) and the relative address identification code of the command matches the address identification code stored in the address register 122, the interface control unit 120 instructs the bypassing module 130 to enable the functional module 140 to perform the first function. The bypassing module 130 may further selectively bypass or non-bypass (i.e. the CS signal is not bypassed) the CS signal to enable or disable the functional module 140 according to a command sent by the host device 10. When the CS signal is being bypassed, the bypassing module 130 transmits the CS signal to the serial bus device 200 via the second connection interface 150 to enable the functional module 240 of the serial bus device 200. When the CS signal is being non-bypassed, the bypassing module 130 transmits the CS signal to the first serial bus device 100 to enable the first functional module 140 of the first serial bus device 100.

Figure 2:
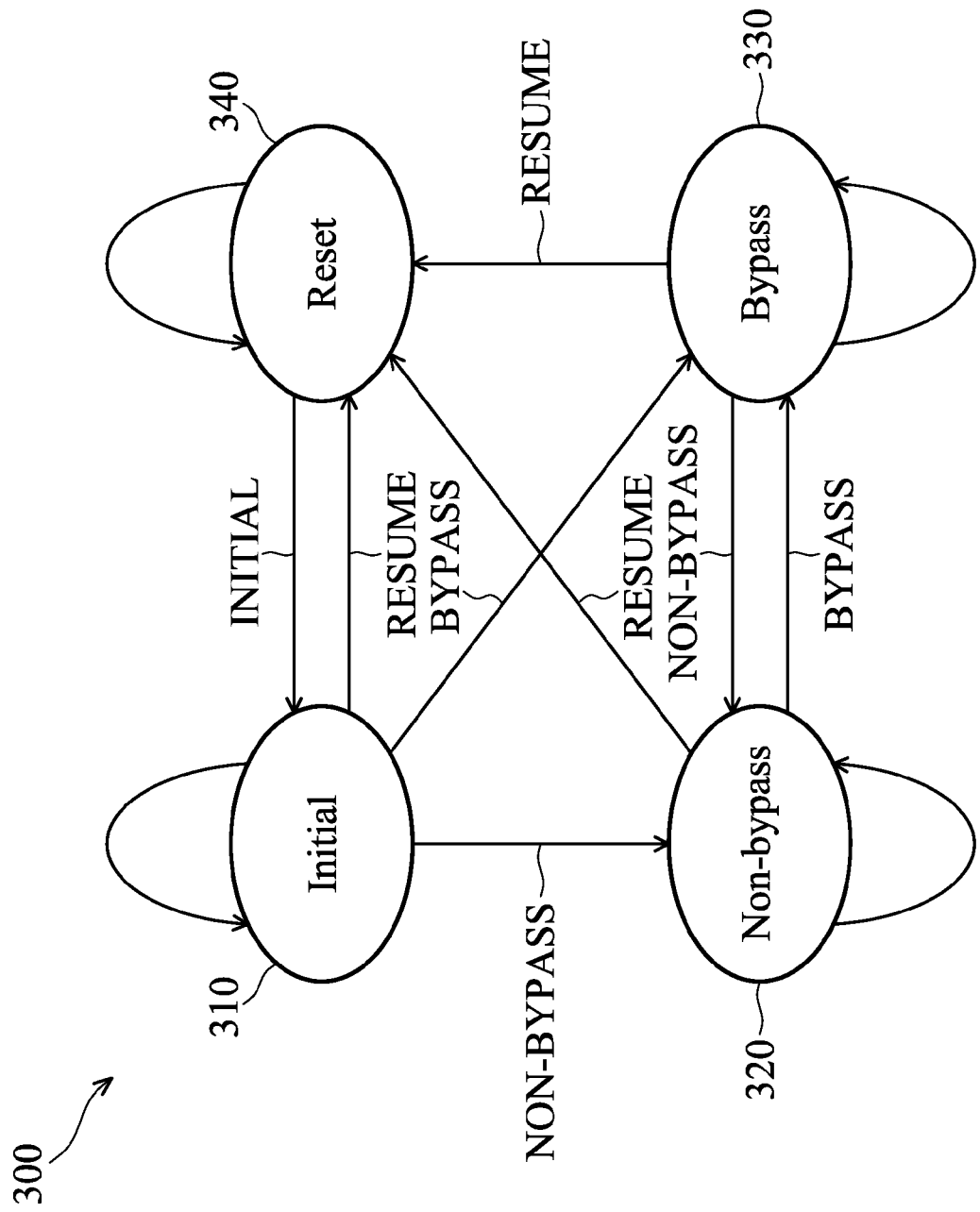
FIG. 2 illustrates an embodiment of a state machine of the disclosure.

FIG. 2 illustrates an embodiment of a state machine 300 of the disclosure. The state machine 300 of the disclosure may be performed on the first serial bus device 100 and the second serial bus device 200 shown in FIG. 1. As shown in FIG. 2, the state machine 300 comprises four states: a reset state 340, an initial state 310, a non-bypass state 320 and a bypass state 330. When the first serial bus device 100 is power-on or reset, the first serial bus device 100 receives an initialization command INITIAL from the host device 10 such that the state of the first serial bus device 100 is changed from an idle state to a standby state and thus the first serial bus device 100 moves from the reset state 340 to the initial state 310. In the initial state 310, when receiving a non-bypass command NON_BYPASS from the host device 10, the state of the first serial bus device 100 is changed to the non-bypass state 320. When receiving a bypass command BYPASS from the host device 10 in the initial state 310, the state of the first serial bus device 100 is changed to the bypass state 330. When operating in the non-bypass state 320, the first serial bus device 100 instructs the bypassing module 130 not to bypass the chip selection signal CS such that the functional module 140 is enabled. In the non-bypass state 320, when receiving a bypass command BYPASS, the state of the first serial bus device 100 is changed to the bypass state 330 while all of the devices including the first serial bus device 100 and the second serial bus device 200 in the bus will restore to the reset state 340 and then changes from the reset state 340 to the initial state 310 after an initialization process when receiving a resume command RESUME. Thereafter, all of the serial bus devices change to the non-bypass state 320 after the initialization process has been completed.

When the first serial bus device 100 operates in the bypass state 330, the interface control unit 120 instructs the bypassing module 130 to disable the functional module 140 and to bypass the chip selection signal CS. Therefore, the chip selection signal CS will be passed to the next stage, i.e. the chip selection signal CS will pass to the second serial bus device

200. In the bypass state 330, the state of the first serial bus device 100 is changed to the non-bypass state 320 when the first serial bus device 100 receives a non-bypass command NON_BYPASS from the host device 10 while the states of the first serial bus device 100 and the second serial bus device 100 will restore to the reset state 340 when a resume command RESUME is received.

An embodiment is used below to explain the detailed process of the cascade method and management method applied therefor of the invention, but the invention is not limited thereto.

Figure 3A:
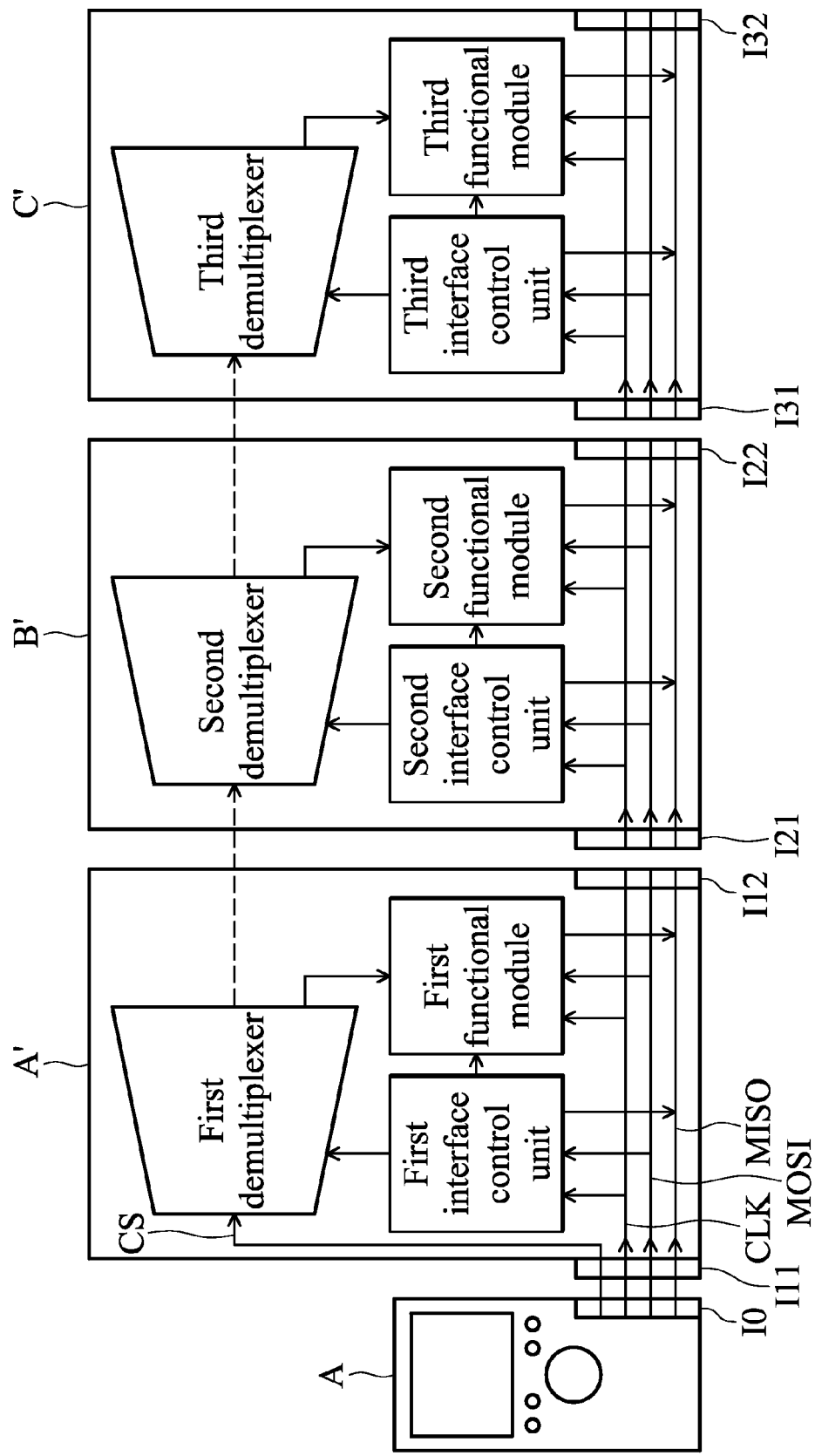
FIG. 3 is a schematic diagram illustrating an embodiment of a way to cascade the serial bus device of the disclosure.
FIG. 3B is an operation timing diagram illustrating a variation in states of the devices from the host device that issues commands to the last serial bus device cascaded.

FIG. 3A is a schematic diagram illustrating an embodiment of a way to cascade the serial bus devices of the disclosure.

In this embodiment, the bypassing module is a demultiplexer or other one-to-multi decoding circuits, wherein the demultiplexer has an input end, two output ends and a control end, The input end is used for receiving the chip selection signal and one of the output ends is connected to the functional module and the other one is connected to the second interface. The control end is used for selectively outputting the chip selection signal to one of the two output ends. For example, if the value of the control end is equal to 0, the chip selection signal is outputted to the functional module thereby enabling the functional module to perform a first function; contrarily, if the value of the control end is equal to 1, the chip selection signal is bypassed and outputted to the second interface. In operation, the control end can be controlled by the interface control unit according to commands received.

As shown in FIG. 3A, a serial bus device A' (the first serial bus device) is connected to the host device A via the connection interface I11, a serial bus device B' (the second serial bus device) is connected to the serial bus device A' via the connection interface I11 and a serial bus device C' (the third serial bus device) is connected to the serial bus device B' via the connection interface I31. The clock signal line (SCK) CLK and data lines MISO and MOSI within the buses of each of the serial bus devices A', B' and C' are independent to each other, however, all of these lines are connected together to form a serial bus. The chip selection line CS within the bus of the serial bus device B' is connected to the output of the first bypassing module of the device A' via the connection interface 121 while the chip selection line CS within the bus of the serial bus device C' is connected to the output of the second bypassing module of the device B' via the connection interface 131.

In one embodiment, once a new serial bus device is plugged-in, the host device 10 may receive an interrupt request for plugging a device and thus performs an interrupt processing routine to all of the serial bus devices to re-initialize and configure all of the serial bus devices.

Figure 4:
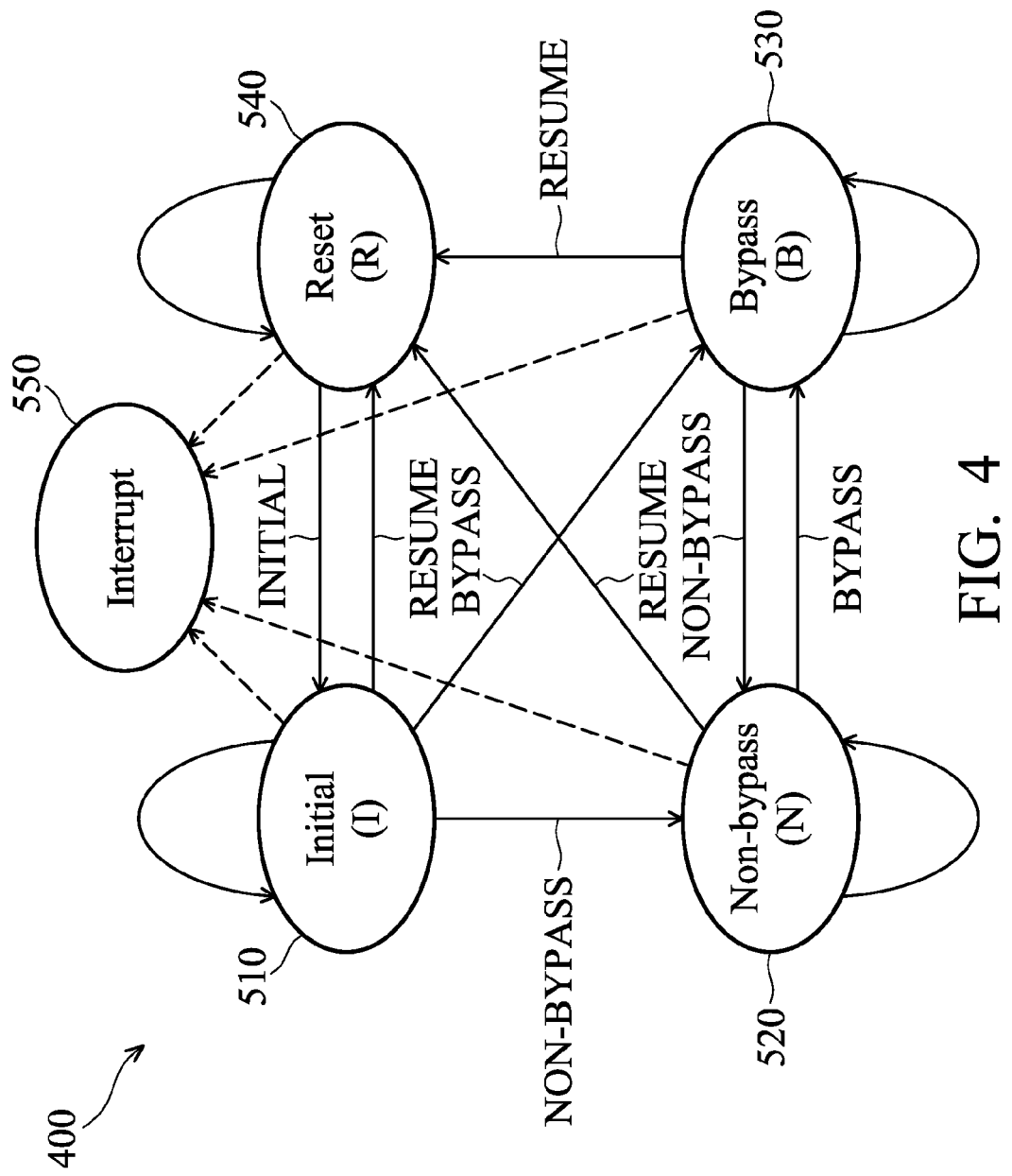
FIG. 4 illustrates another embodiment of a state machine of the disclosure.

FIG. 4 illustrates another embodiment of a state machine 400 of the disclosure. The state machine 400 of the disclosure may be performed on all of the cascaded serial bus devices. As shown in FIG. 4, the state machine 400 comprises five states: a reset state (R) 540, an initialization state (I) 510, a non-bypass state (N) 520, a bypass state (B) 530 and an interrupt state (INT) 550. The state machine 400 is similar to the state machine 200 except for that an additional interrupt state (INT) 550 is added therein in which the dotted line portion shown therein indicates the state transition for the interrupt command INT and thus detailed are omitted here for brevity.

Referring to FIG. 3A, when the third serial bus device C' plugs into the second serial bus device B', the third serial bus device C' issues and interrupt request signal to the host device 10 by using the interrupt command INT. Thereafter, when both of the signal lines CS and MISO remain in high voltage levels, the host device 10 receives the interrupt request signal and issues a reset command RESET to all devices cascaded in the serial bus in response to the interrupt request signal such that states of all of the devices cascaded in the serial bus will be changed from current state to the reset state 340 and then from the reset state 340, the initial state 310 to the non-bypass state 320 after an initialization process has been done. The interrupt processing routine will be described more detail in below.

Figure 5:
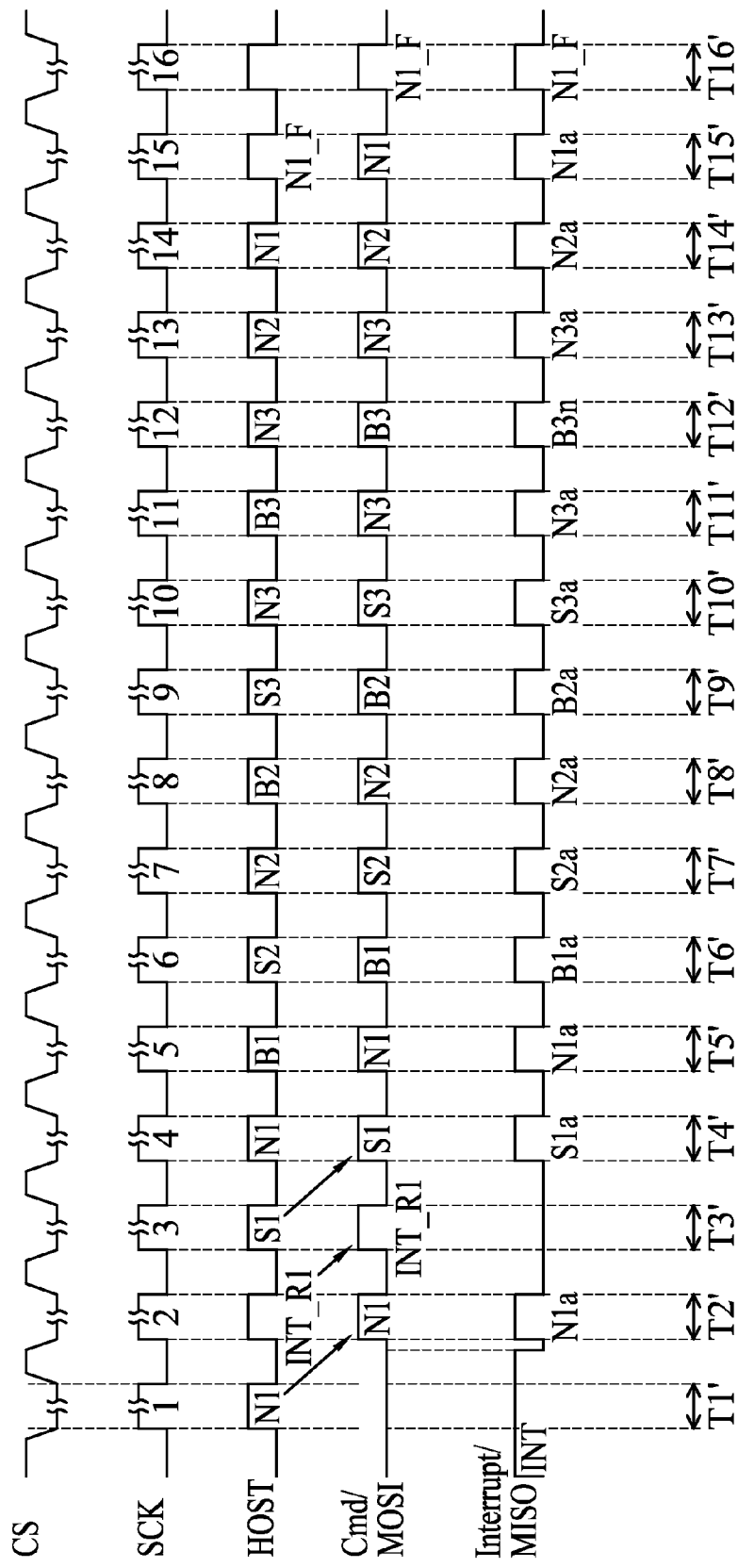
FIG. 5 is an operation timing diagram illustrating an embodiment of an interrupt processing routine of the disclosure.

FIG. 5 is an operation timing diagram illustrating an embodiment of an interrupt processing routine of the disclosure. As shown in FIG. 5, signal lines CS, HOST, SCK, Cmd/MOSI and Interrupt/MISO respectively represent a variation in the CS signal, the host device A, the clock signal and the data lines, wherein each waveform time of the CS signal may not be fixed and a number of each SCK may also not be fixed and a number of bytes for Host/Cmd(MOSI)/Response(MISO/Interrupt) may be not fixed and may be modified according to the Cmd or Response requirement. In the following embodiment, commands SX, NX and BX respectively represent an initialization command, a non-bypass command and a bypass command issued to the serial bus device X from the host device while commands sXa, nXa and bXa, which respectively represent complete commands for the serial bus device X in an initial state (s), a non-bypass state (n) and a bypass state (b) are Ack commands that the serial bus device X replies to the host device, wherein label "a" indicates that there is an acknowledgement (referred to as "ack") while label "n" indicates that there is no acknowledgement (referred to as "non-ack"). For example, in this embodiment, commands S1 and N1 respectively represent an initialization command and a non-bypass command issued to the serial bus device A' from the host device A while commands s2a and n2a respectively represent Ack commands replied to the host device A for the serial bus device A' in the initial state(s) and the non-bypass state (n).

Please refer together with FIG. 3A, FIG. 4 and FIG. 5, when the third serial bus device C' has been plugged into the second serial bus device B', in time period T1', signal line MISO remains in high voltage level and the third serial bus device C' sends an interrupt signal to the host device 10 by issuing an interrupt command INT.

When both of the signal lines CS and MISO remain in high voltage levels, in a time between time periods T1' and T2', the host device 10 receives the interrupt signal and issues a reset command INT_Rx to all devices in response to the interrupt signal such that sates of all of the devices cascaded in the serial bus will be changed from current state to the reset/idle state 540.

In time period T3', the host device A issues an initialization command "S1".

Thereafter, in time period T4', current state of the first serial bus device A' is changed from the reset/idle state (R) 540 to the initialization/standby (S) state 510. Meanwhile, the first serial bus device A' replies a S1a signal to the host device A to inform that the initialization command has received and performed by the first serial bus device A'. The first serial bus device A' then replies an Ack signal to the host device A. After receiving the replied Ack signal, the host device A issues a non-bypass command (N1).

In time period T4', the first serial bus device A' receives the non-bypass command from the host device A such that current state of the first serial bus device A' is changed from the initialization/standby (S) state 510 to the non-bypass state 520.

In time period T5', the first serial bus device A' replies a N1a signal to the host device A to inform that the non-bypass command has received and performed by the first serial bus device A'. The first serial bus device A' then replies an Ack signal to the host device A. After receiving the replied Ack signal, the host device A further issues a bypass command (B1).

In time period T6', after the host device A issues bypass command (B1), current state of the first serial bus device A' is changed from the non-bypass state (N) 520 to the bypass state (B) 530. Meanwhile, the first serial bus device A' replies a B1a signal to the host device A to inform that the bypass command has received and performed by the first serial bus device A'. The first serial bus device A' then replies an Ack signal to the host device A. After receiving the replied Ack signal, the host device A further issues an initialization command (S2).

In time period T7', after the host device A issues the initialization command (S2), current state of the second serial bus device B' is changed from the reset/idle state (R) 540 to the initialization/standby (S) state 510. Meanwhile, the second serial bus device B' replies a S2a signal to the host device A to inform that the initialization command has received and performed by the second serial bus device B'. The second serial bus device B' then replies an Ack signal to the host device A. After receiving the replied Ack signal, the host device A issues a non-bypass command (N2).

In time period T8', after the host device A issues the non-bypass command (N2), current state of the second serial bus device B' is changed from the initialization/standby (S) state 510 to the non-bypass state 520. Meanwhile, the second serial bus device B' replies a N2a signal to the host device A to inform that the non-bypass command has received and performed by the second serial bus device B'. The second serial bus device B' then replies an Ack signal to the host device A. After receiving the replied Ack signal, the host device A further issues a bypass command (B2).

In time period T9', after the host device A issues the bypass command (B2), current state of the second serial bus device B' is changed from the non-bypass state (N) 520 to the bypass state (B) 530. Meanwhile, the second serial bus device B' replies a B2a signal to the host device A to inform that the bypass command has received and performed by the second serial bus device B'. The second serial bus device B' then replies an Ack signal to the host device A. After receiving the replied Ack signal, the host device A further issues an initialization command (S3).

In time period T10', after the host device A issues the initialization command (S3), current state of the third serial bus device C' is changed from the reset/idle state (R) 540 to the initialization/standby (S) state 510. Meanwhile, the third serial bus device C' replies a S3a signal to the host device A to inform that the initialization command has received and performed by the third serial bus device C'. The third serial bus device C' then replies an Ack signal to the host device A. After receiving the replied Ack signal, the host device A issues a non-bypass command (N3).

In time period T11', after the host device A issues the non-bypass command (N3), current state of the third serial bus device C' is changed from the initialization/standby (S) state 510 to the non-bypass state 520. Meanwhile, the third serial bus device C' replies a N3a signal to the host device A to inform that the non-bypass command has received and performed by the third serial bus device C'. The third serial bus device C' then replies an Ack signal to the host device A. After receiving the replied Ack signal, the host device A further issues a bypass command (B3).

In time period T12', after the host device A issues the bypass command (B3), current state of the third serial bus device C' is changed from the non-bypass state (N) 520 to the bypass state (B) 530. Meanwhile, the third serial bus device C' replies a B3a signal to the host device A to inform that the bypass command has received and performed by the third serial bus device C'. When performing the bypass command BYPASS, the third serial bus device C' replies a non-ack signal B3n to the host device A since no replied Ack signal has been received within a counting time, which indicates that there is no more next device. That is, no further next device needs to be initialized, i.e., all of the devices have been initialized. After receiving the replied non-ack signal, the host device A then prepares to set all of the devices back to the non-bypass state (N) 520 and thus issues a non-bypass command (N3).

In time period T13', after the host device A issues the non-bypass command (N3), current state of the third serial bus device C' is changed from the bypass state (B) 530 to the non-bypass state 520. Meanwhile, the third serial bus device C' replies a N3a signal to the host device A to inform that the non-bypass command has received and performed by the third serial bus device C'. The third serial bus device C' then replies an Ack signal to the host device A. After receiving the replied Ack signal, the host device A further issues a non-bypass command (N2).

In time period T14', after the host device A issues the non-bypass command (N2), current state of the second serial bus device B' is changed from the bypass state (B) 530 to the non-bypass state 520. Meanwhile, the second serial bus device B' replies a N2a signal to the host device A to inform that the non-bypass command has received and performed by the second serial bus device B'. The second serial bus device B' then replies an Ack signal to the host device A. After receiving the replied Ack signal, the host device A further issues a non-bypass command (N1).

In time period T15', after the host device A issues the non-bypass command (N1), current state of the first serial bus device A' is changed from the bypass state 530 to the non-bypass (N) state 520. Meanwhile, the first serial bus device A' replies a N1a signal to the host device A to inform that the non-bypass command has received and performed by the first serial bus device A'. The first serial bus device A' then replies an Ack signal to the host device A. After receiving the replied Ack signal which represents that all of the devices have been configured, the host device A issues a N1_F (Non_ByPass_Finish_For_All_Sys) command for indicating that the interrupt processing routine has been finished.

In time period T16', each of the devices receives a N1_F (Non_ByPass_Finish_For_All_Sys) command, which indicates that the interrupt processing routine ends.

Another embodiment is used below to explain the detailed process of the cascade method and management method applied therefor of the invention, but the invention is not limited thereto.

In this embodiment, it is assumed that serial bus devices A', B' and C' capable of performing a wireless communication function, a GPS function and a data storage function respectively and those devices A', B' and C' have been cascaded together as shown in FIG. 3A. It is also assumed that all of the devices have already completed the reset and initialization processes and thus current state of each of the devices has changed from an idle state to a standby state as shown in FIG. 2.

Figure 3B:
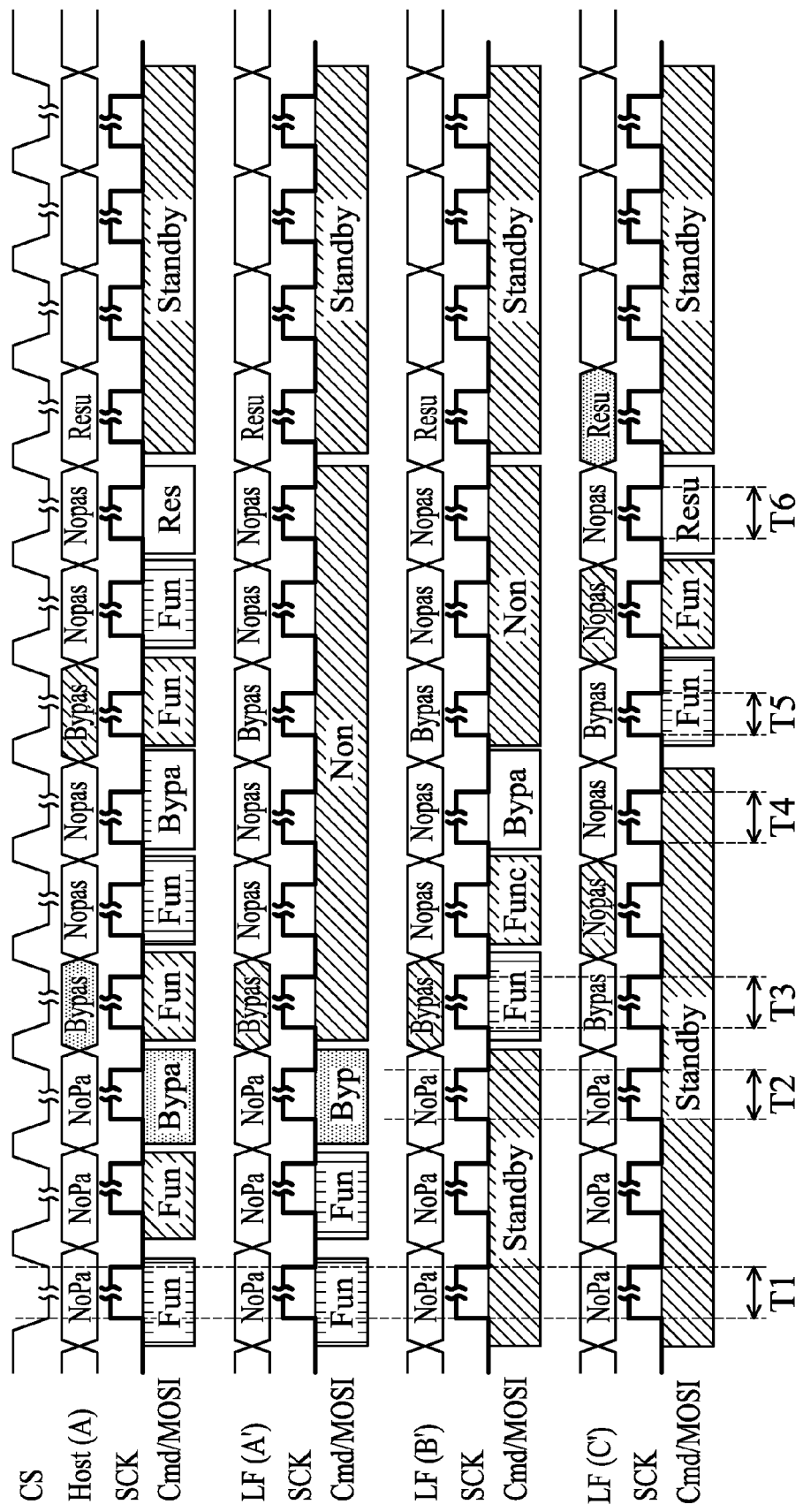

FIG. 3B is an operation timing diagram of FIG. 3A illustrating a variation in states of the devices from the host device that issues commands to the last serial bus device cascaded. As shown in FIG. 3B, signal lines CS, Host(A), SCK and Cmd/MOSI respectively represent a variation in the CS signal, the host device A, the clock signal and the data line, wherein each waveform time of the CS signal may not be fixed and the number of each SCK may also not be fixed and the number of bytes for Host/Cmd(MOSI)/Response(MISO/Interrupt) may not be fixed and may be modified according to the Cmd or Response requirement.

First, at time point T1, the device A' receives a command NON-BYPASS from the host device A such that current state of the device A' is changed from the standby state to the non-bypass state, which indicates that the CS signal will not be bypassed by the first bypassing module (i.e. the first demultiplexer). That is, the first functional module will be enabled to receive command from the host device A or reply a request of the host device A. Therefore, the host device A can perform a wireless communication via the first functional module.

Thereafter, at time point T2, the device A' receives a command BYPASS from the host device A such that current state of the device A' is changed to from the non-bypass state to the bypass state, which indicates that the CS signal will be bypassed by the second bypassing module (the second demultiplexer). That is, the wireless communication function of the first functional module will be disabled and thus no further operation will be performed by the first functional module. Meanwhile, the first bypassing module passes the CS signal to next stage of the cascaded serial bus devices, the serial bus device B'.

At time point T3, the device B' receives a command NON-BYPASS from the host device A such that current state of the device B' is changed from the non-bypass state to the bypass state, which indicates that the CS signal will not be bypassed by the second bypassing module (the second demultiplexer). That is, the second functional module will be enabled to receive command from the host device A or reply a request of the host device A. Therefore, the host device A can perform a GPS function for navigation via the second functional module.

Thereafter, at time point T4, the device B' receives a command BYPASS from the host device A such that current state of the device B' is changed from the non-bypass state to the bypass state, which indicates that the CS signal will be bypassed by the second bypassing module. That is, the GPS function of the second functional module will be disabled and thus no further operation will be performed by the second functional module. Meanwhile, the second bypassing module passes the CS signal to next stage of the cascaded serial bus devices, the serial bus device C'.

At fifth time point T5, the device C' receives the command NON-BYPASS from the host device A such that current state of the device C' is changed to the non-bypass state, which indicates that the CS signal will not be bypassed by the third bypassing module (the third demultiplexer). That is, the third functional module will be activated to receive command from the host device A or reply a request of the host device A. Therefore, the host device A can access data via the third functional module.

Finally, at sixth time point T6, all of the devices A', B' and C' receive the resume command RESUME such that states of the devices return to the standby state from non-bypass/bypass state and thus all of the devises may continually proceed a corresponding operation according to subsequent commands.

Therefore, by ways of bypassing/non-bypassing the CS signal, each of the serial bus devices cascaded can be controlled and each of the functions provided by the serial bus devices can be separately used.

Systems and methods thereof, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in the technology can still make various alterations and modifications without departing from the scope and spirit of this invention (e.g., use a ring buffer). Therefore, the scope of the present invention shall be defined and protected by the following claims and their equivalents.

What is claimed is:

1. A cascade-able serial bus card device for coupling between a host device and a second serial bus card device, wherein the host device includes a serial bus interface, the cascade-able serial bus card device comprising:
    a first connection interface coupled to the serial bus interface of the host device;
    a second connection interface coupled to the second serial bus card device; and
    a bypassing module coupled to a CS (chip select) signal line of the serial bus interface and the second connection interface for receiving a CS signal and selectively bypassing or non-bypassing a CS signal according to a command sent by the host device,
    wherein when the CS signal is being non-bypassed, the bypassing module transmits the CS signal to the cascade-able serial bus card device such that the host device utilizes a first function provided by the cascade-able serial bus card device;
    when the CS signal is being bypassed, the bypassing module transmits the CS signal to the second serial bus card device via the second connection interface such that the host device utilizes a second function provided by the second serial bus card device;
    wherein the cascade-able serial bus card device and the second serial bus card device are both SD card devices; and
    wherein the sizes of the cascade-able serial bus card device and the second serial bus card device are substantially the same and the positions of the cascade-able serial bus card device and the second serial bus card device are interchangeable and an interrupt signal is sent to the host device for informing the host device when the second serial bus card device is plugged into the cascade-able serial bus card device or when a third serial bus card device is plugged into the second serial bus card device.

2. The cascade-able serial bus card device of claim 1, wherein a serial clock signal line and at least one data line of the serial bus interface are shared by the host device, the cascade-able serial bus card device and the second serial bus card device.

3. The cascade-able serial bus card device of claim 1, further comprising an interface control unit for analyzing the command sent by the host device and instructing the bypassing module to bypass or non-bypass the CS signal according to the analyzing result.

4. The cascade-able serial bus card device of claim 3, wherein the interface control unit further comprises a register for storing an address identification code corresponding to the cascade-able serial bus card device, wherein the interface control unit further compares the location identification code in the register with information corresponding to an address identification code within the command for determining whether to process the command.

5. The cascade-able serial bus card device of claim 1, further comprising a functional module for performing the first function, wherein the functional module performs the first function when receiving the CS signal sent by the bypassing module, and wherein the functional module comprises a wireless module, a BLUETOOTH module, a GPS module, a data storage module or any I/O device with a serial bus.

6. The cascade-able serial bus card device of claim 1, wherein the command further comprises a resume command for resuming all of the devices in the cascade-able serial bus card device.

7. The cascade-able serial bus card device of claim 1, wherein the command further comprises an initialization command for initializing all of the devices in the cascade-able serial bus card device one by one.

8. The cascade-able serial bus card device of claim 1, wherein the command further comprises a non-bypass command for instructing the bypassing module to enable the first function.

9. The cascade-able serial bus card device of claim 1, wherein the command further comprises a bypass command for instructing the bypassing module to transmit the CS signal to the second serial bus card device to enable the second function.

10. The cascade-able serial bus card device of claim 1, wherein the command comprises an interrupt command for informing the host device to re-configure all of the serial bus card devices when the third serial bus card device is plugged into the second serial bus card device.

11. The cascade-able serial bus card device of claim 10, wherein the host device further re-initializes and re-configures all of the serial bus card devices after the interrupt command has been received.

12. The serial cascade-able serial bus card of claim 1, wherein the first connector is a male connector for a SD interface.

13. The cascade-able serial bus card device of claim 1, wherein the serial bus interface of the cascade-able serial bus card device is a SPI (Serial Peripheral Interface).

14. The cascade-able serial bus card device of claim 1, wherein the cascade-able serial bus card device and the second serial bus card device are I/O (Input/Output) devices with a SPI (Serial Peripheral Interface) or storage devices with a SPI.

15. The cascade-able serial bus card device of claim 1, wherein the host device is a portable electronic device.

16. A management method for managing cascaded at least one first serial bus device and one second serial bus device, wherein the first serial bus device is coupled to a host device, the second serial bus device is coupled to the first serial bus device and each of the first and second serial bus devices has a serial bus interface which is serial-clock based, the management method comprising:

transmitting a CS (chip select) signal to the first serial bus device;

sending, by the host device, a first command to the first serial bus device to request the first serial bus device to reply an identification code of a first device therein;

replying, by the first serial bus device, the identification code of the first device of the first serial bus device to the host device according to the first command after receiving the first command;

sending, by the host device, a second command to the first serial bus device and configuring a relative address identification code corresponding to the first serial bus device to an address register of an interface control unit of the first serial bus device; and determining, by the first serial bus device, whether to bypass or non-bypass the CS signal according to the second command and a comparison of whether the relative address identification code of the command matches the identification code stored in the address register of an interface control unit of the first serial bus device;

wherein when the command is a predetermined command and the relative address identification code of the command matches the identification code stored in the address register of the interface control unit of the first serial bus device, the CS signal is bypassed to the second serial bus device by the first serial bus device and the second serial bus device further determines whether to bypass the CS signal or to enable a second function according to the second command and a comparison of whether the relative address identification code of the command matches the identification code stored in an address register of an interface control unit of the second serial bus device;

when the command is not the predetermined command and the relative address identification code of the command matches the identification code stored in the address register of the interface control unit of the first serial bus device, a first function is enabled by the first serial bus device;

wherein the first serial bus device and the second serial bus device are both SD card devices; and wherein the sizes of the first serial bus device and the second serial bus device are substantially the same and the positions of the first serial bus device and the second serial bus device are interchangeable and an interrupt signal is sent to the host device for informing the host device when the second serial bus device is plugged into the first serial bus device or when a third serial bus device is plugged into the second serial bus device.

17. The management method of claim 16, further comprising:

when the relative address identification code of the command does not match the identification code stored in the address register of the interface control unit of the first serial bus device, the first serial bus device ignores the second command.

18. The management method of claim 16, wherein the predetermined command comprises a bypass command for instructing a bypassing module of the first serial bus device to pass the CS signal to the second serial bus device to enable the second function or to bypass the CS signal.

19. The management method of claim 16, wherein a serial clock signal line and at least one data line of the serial bus interface are shared by the host device, the first serial bus device and the second serial bus device.

20. A cascading method for use in a first serial bus device with a clock for cascading at least one second serial bus device with the same clock, wherein the first serial bus device and the second serial bus device respectively have first and second bypassing modules, each of the bypassing modules with at least an input end, a first output end and a second output end, the method further comprising:

providing a first connection interface for connecting to a host device, wherein the host device transmits a command and provides a CS (chip selection) signal and a serial clock signal line; and providing a second connection interface for connecting to the second serial bus device;

wherein the input end of the first bypassing module receives the CS signal, the first output end is coupled to a first functional module for performing a first function and the second output end is coupled to the input end of the second bypassing module;

wherein the first bypassing module further bypasses the CS signal and transmits the CS signal to the second bypassing module via the second output end of the first bypassing module to perform a second function provided by the second serial bus device when the command transmitted by the host device is a predetermined command while the first bypassing module further enables the first functional module to perform the first function when the command is not the predetermined command;

wherein the first serial bus device and the second serial bus device are both SD card devices; and wherein the sizes of the first serial bus device and the second serial bus device are substantially the same and the positions of the first serial bus device and the second serial bus device are interchangeable and an interrupt signal is sent to the host device for informing the host device when the second serial bus device is plugged into the first serial bus device or when a third serial bus device is plugged into the second serial bus device.

21. The cascading method of claim 20, wherein the command further comprises a bypass command for instructing the first bypassing module to pass the CS signal to the second bypassing module to enable the second function.

22. The cascading method of claim 20, wherein the command further comprises an initialization command, a non-bypass command, an interrupt command or a resume command.

23. The cascading method of claim 20, wherein the first bypassing module and the second bypassing module are implemented by demultiplexers or other one-to-multi decoding circuits.

* * * * *